P. GRAEFE.
APPARATUS FOR SEPARATING OUT LIQUIDS FROM VAPORS AND GASES.
APPLICATION FILED JULY 15, 1912.

1,072,941.

Patented Sept. 9, 1913.

UNITED STATES PATENT OFFICE.

PAUL GRAEFE, OF MALLMITZ, GERMANY.

APPARATUS FOR SEPARATING OUT LIQUIDS FROM VAPORS AND GASES.

1,072,941.  Specification of Letters Patent.  Patented Sept. 9, 1913.

Application filed July 15, 1912. Serial No. 709,605.

*To all whom it may concern:*

Be it known that I, PAUL GRAEFE, engineer, a subject of the German Emperor, residing at Mallmitz, Silesia, Germany, have invented certain new and useful Improvements in Apparatus for Separating Out Liquids from Vapors and Gases, of which the following is a specification.

The present invention relates to an apparatus for separating moisture from vapors and gases and consists in the provision, in a receptacle through which the fluid is passed, of plain and slotted plates, arranged alternatively, the slotted plates being provided with off-set tongues by which the fluid is baffled and cleared of moisture which is suitably collected and drained off along the plain plates.

The invention consists of certain novel constructions, combinations and arrangements of parts, all of which will be hereinafter more particularly set forth and claimed.

In the accompanying drawing forming part of this specification and comprising one sheet, the new invention is represented by way of illustration; therein—

Figure 1:
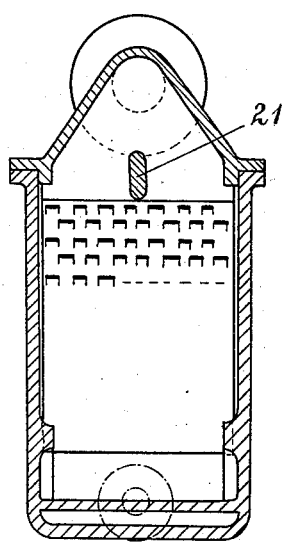
Figure 2:
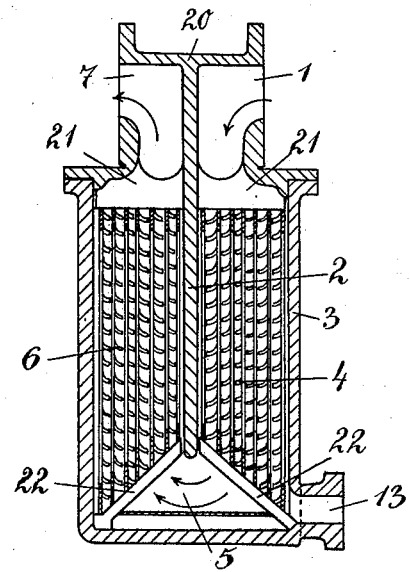
Figure 3:
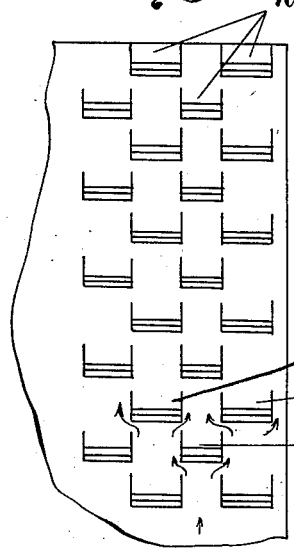
Figures 4, 5:
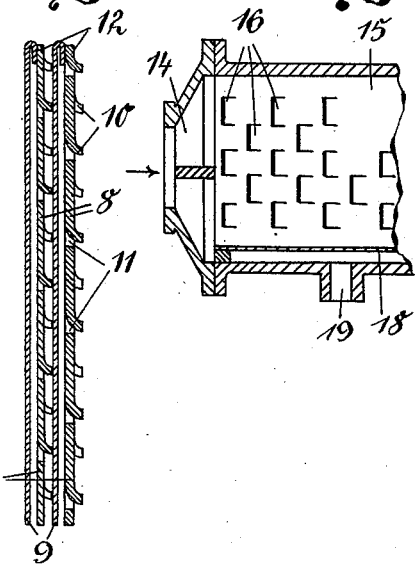

Figures 1 and 2 show two longitudinal sections perpendicular to each other through a vertical apparatus consisting of two chambers. The Figs. 3 and 4 represent in detail a section of the two sheets forming the interior body of the apparatus in elevation and longitudinal section. Fig. 5 is a longitudinal section through a horizontal apparatus consisting of one chamber.

In the example as represented the arrows show the direction of flow of the gaseous or vaporous medium under treatment; in the form of embodiment as shown in Figs. 1 and 2, such medium enters through the aperture 1 in a suitable head into the apparatus, hereafter traversing, as shown in Fig. 2, the right-hand perpendicular chamber 4 intermediate the central partition wall 2 and the outer mantle 3; next the medium passes at the bottom side around the partition-wall 2, as is shown diagrammatically by the curved arrows 5, then ascends again into the left-hand chamber 6, and is finally discharged through the aperture 7. The interior body promoting the separation of the waste water, oil or the like from the gaseous or vaporous fluid, that is provided in the two chambers 4 and 6, comprises, as mentioned already, two different kinds of plates 8 and 9, arranged alternatively. The plates 8 are provided with a plurality of slots 11 from which tongues 10 are stamped and set off as shown in Fig. 4. The plates 9 however, are plain without incisions or windows and are kept at a small distance from the plates 8 by their flanged borders 12.

The manner of operation, resulting from such construction, is already intimated in Fig. 3. The vaporous or gaseous medium, coming as represented from below, strikes, when progressing, against the tongues 10, bent out from the plate 8, and is compelled thereby to disjoin into two branches, surrounding the tongue. After having surrounded the tongue 10′, the two branches of the medium-flow impinge against two further tongues $10^2$ and $10^3$, compelling anew the stream of the medium, impinging thereagainst to divide into two branches, in order to surround these tongues. In such manner the flow of the medium, when progressing, is divided again and again, and the several branches come against new tongue-pieces, splitting them up; behind each tongue they unite themselves again with other branch-streams, until finally, at the top-end of the plates, the various flows all unite again in the uppermost chamber and leave the apparatus through the outlet-opening 7. At each striking of the vaporous or gaseous medium against a tongue, met with in the traject, a portion of the liquid, waste water, oil or the like, entrained in the medium, is separated out at the tongue; in this manner the medium is dried ever more when progressing. The separated out liquid, however, enters the hollow space intermediate the plate 8, carrying the tongues, and the rearward plate 9, not perforated; in such hollow spaces the separated out particles of waste water, oil or their equivalents collect without hindrance. They flow down therein and are finally discharged through the outlet socket 13. The principle operates in the same manner in the one-chamber separating apparatus, represented in Fig. 5; therein the vaporous or gaseous medium under treatment enters through the aperture 14 in the direction of the arrow. Then it progresses in the one horizontal chamber 15, it being freed from the entrained liquid when coming against the tongues 16 and leaves ultimately the separating apparatus in the direction of the second arrow 17. The liquid medium, separated out by the tongues 16, is led off along the plates carrying the tongues to a collecting chamber 18, whence it is discharged through a socket 19.

It is advisable to construct the apparatus on the lines indicated in Fig. 2, the receptacle 3 being open at the top and closed by a head 20 which carries the partition 2. The plates 8 and 9 are loosely arranged on inclined supporting bars 22 and held in position by cross-bars 21 places between the top-edges of the same and the head 20. In this manner the apparatus can be easily assembled and disassembled.

Other constructions, within the scope of the invention, may be resorted to in accordance with practical requirements.

Having thus described my invention what I claim as new and desire to secure by Letters Patent in the United States is:—

1. An apparatus for separating out liquids from vapors and gases, comprising a receptacle, plain and slotted plates arranged alternately in said receptacle, tongues stamped out from the slots of said slotted plates and set-off so as to abut against said plain plates, said tongues being arranged in rows in a staggered position so as to baffle the fluid or medium and clear the same of moisture which is led through the slots and along the plain plates to the bottom of the receptacle, substantially as set forth.

2. An apparatus for separating out liquids from vapors and gases, comprising an upright receptacle closed by a head having inlet and outlet ports, a central partition arranged on said head and between the inlet and outlet ports and adapted to lead the fluid or medium first down and then up through said receptacle, plain and slotted plates arranged alternately behind said head, tongues stamped out from the slots of said slotted plates and set off so as to abut against said plain plates, said tongues being arranged in rows in a staggered position, inclined bars at the bottom of the receptacle for supporting said plates, and cross-bars arranged between said head and the upper edges of the plates for holding the latter in position and connecting them with said head to a removable whole, substantially as set forth.

In testimony whereof, I affix my signature in the presence of two witnesses.

PAUL GRAEFE.

Witnesses:
FRED. C. O. ROEDER,
MAX GRAEFE.